United States Patent
Miyake et al.

(10) Patent No.: US 7,468,016 B2
(45) Date of Patent: Dec. 23, 2008

(54) CHARACTERISTICS CORRECTION SYSTEM FOR AUTOMATIC TRANSMISSION

(75) Inventors: Yasuyuki Miyake, Tokyo (JP); Kouichi Inoue, Tokyo (JP); Tokuju Kuji, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 212 days.

(21) Appl. No.: 10/549,669

(22) PCT Filed: Mar. 17, 2004

(86) PCT No.: PCT/JP2004/003519
§ 371 (c)(1),
(2), (4) Date: Sep. 19, 2005

(87) PCT Pub. No.: WO2004/083688
PCT Pub. Date: Sep. 30, 2004

(65) Prior Publication Data
US 2006/0229788 A1    Oct. 12, 2006

(30) Foreign Application Priority Data
Mar. 19, 2003    (JP)    ............................. 2003-076131

(51) Int. Cl.
F16H 61/48    (2006.01)
G06F 7/00    (2006.01)
G06F 17/00    (2006.01)
G06F 19/00    (2006.01)

(52) U.S. Cl. ......................................... 477/53; 701/59
(58) Field of Classification Search .................... 477/53, 477/906, 905; 701/58, 59, 29, 31
See application file for complete search history.

(56) References Cited

U.S. PATENT DOCUMENTS 4,951,205 A  *  8/1990   Lowe et al. ................... 701/63

(Continued)

FOREIGN PATENT DOCUMENTS

DE    WO 98/17929    4/1998

(Continued)

OTHER PUBLICATIONS

Official Action issued to Japanese Patent Application No. 2003-076131 having a mail date of Oct. 19, 2007 (w/translation).

*Primary Examiner*—Tisha D Lewis
(74) *Attorney, Agent, or Firm*—Smith, Gambrell & Russell, LLP (57) ABSTRACT

In a property correcting system of an automatic transmission according to the present invention, a difference of revolutions between input revolutions Nin of a torque converter and turbine revolutions Nt is compared with target rotational difference $\Delta N$, and is increased/reduced by the feedback operation (S6 and S7). It is checked to see if the difference of revolutions is converged to the target rotational difference $\Delta N$ (S8). When a driving duty duty which is converged to the target rotational difference $\Delta N$ is within a shipping determining standard, the value is stored (S10). A differential value between the stored driving duties duty of the respective automatic transmissions and the reference value is written to a TCU, as the amount of correction of the respective automatic transmissions, thereby correcting the variation in properties of the individual automatic transmissions, starting from the initial shipping timing. A preferable shift quality is obtained without prompting the learning based on the actual driving.

17 Claims, 5 Drawing Sheets

U.S. PATENT DOCUMENTS

| | | | |
|---|---|---|---|
| 5,121,820 A * | 6/1992 | Brown et al. | 192/3.3 |
| 5,743,826 A | 4/1998 | Usuki et al. | |
| 5,790,967 A * | 8/1998 | Kull et al. | 701/51 |
| 6,155,948 A * | 12/2000 | Gierer | 475/123 |
| 6,931,924 B1 * | 8/2005 | Henneken | 73/168 |

FOREIGN PATENT DOCUMENTS

| | | |
|---|---|---|
| JP | 8-254262 | 10/1996 |
| JP | 10-184410 | 7/1998 |
| JP | 2001-502405 | 2/2001 |
| JP | 2002-295662 | 10/2002 |
| JP | 2003-004130 | 1/2003 |
| JP | 2003-14119 | 1/2003 |
| JP | 2003-254418 | 9/2003 |
| JP | 2003-287119 | 10/2003 |

* cited by examiner

CHARACTERISTICS CORRECTION SYSTEM FOR AUTOMATIC TRANSMISSION

DESCRIPTION

1. Technical Field

The present invention relates to a property correcting system of an automatic transmission capable of producing a preferable shift quality by correcting the variation in properties of respective automatic transmissions.

2. Background Art

In general, an automatic transmission provided for a vehicle such as an automobile has a tolerance of parts in components and therefore a slight variation in properties due to individual parts is inevitable in the final assembly. The amount of variations needs to be suppressed so as to improve the performance of the vehicle as much as possible. At the same time, the reduction in tolerance with ensuring the process capability in a manufacturing factory increases costs.

In particular, in a so-called direct-AT-system automatic transmission for controlling the engagement (that is, for controlling the oil pressure) of frictional engaging elements by arranging a solenoid valve to each frictional engaging element such as a clutch or brake, the dispersion or unevenness in the manufacturing, aged deterioration and friction and the like in solenoid valves and/or frictional engaging elements cause the variation in shift quality.

In order to suppress the above-mentioned variation in shift qualities of the transmission and to obtain a preferable shift quality, generally, the learning control is performed on the basis of information on input revolutions of the automatic transmission. For example, Japanese Unexamined Patent Application Publication No. 10-184410 discloses a technology for learning and correcting an oil pressure (controlled oil pressure), as the target, based on the rate of change in input revolutions and the rate of change in target revolutions at an inertia phase at the up-shift timing.

However, the ensuring a preferable shift quality by the learning control needs a considerable amount of time of actual vehicle driving test. In consideration of a task time of factory, it is hard to perform the learning at the stage of product shipping. Therefore, conventionally, upon shipping the automatic transmission, the automatic transmission is driven on a complete operation (trial run) bench, and the shipping inspection for measuring the oil pressure of a clutch or the like is performed. The product test is determined based on as whether or not the oil pressure measured in the shipping inspection is within an allowable range.

As mentioned above, in the complete operation of the conventional automatic transmission, the oil pressure of the clutch or the like is measured and it is determined whether or not the product can be shipped by checking if the oil pressure is within an allowable range. Therefore, the measurement of oil pressure is influenced from the difference in devices having specifications for respective complete operation benches, the deviation in corrected values or the deterioration of an oil pressure sensor for detecting the oil pressure, or the mixture of air in a pipe, and the improvement in measurement precision is limited. Thus, in order to obtain the preferable shift quality which solves the variation in individual automatic transmissions, there is a problem that the leaning result of actual vehicle driving test in the market to some degree is necessary.

The present invention is devised in consideration of the above circumferences, and it is an object of the present invention to provide a property correcting system of an automatic transmission, which corrects the variation in properties of respective automatic transmissions without prompting the learning based on the actual vehicle driving test to obtain a preferable shift quality.

DISCLOSURE OF INVENTION

According to the present invention, a property correcting system of an automatic transmission performs the shift operation by engaging and disengaging frictional engaging elements in a multi-stage transmission unit arranged to a torque converter using a hydraulic control valve. The property correcting system of the automatic transmission comprises: means for calculating the amount of correction of control data based on a result of a test driving performed after assembling the automatic transmission, the control data being based on a reference property of the automatic transmission; and means for storing the amount of correction to an electronic control device for controlling the automatic transmission after assembling the automatic transmission to a vehicle.

BRIEF DESCRIPTION OF THE DRAWINGS

FIGS. 1 to 3 relate to a first embodiment of the present invention.

BEST MODE FOR CARRYING OUT THE INVENTION

Hereinbelow, embodiments of the present invention will be described with reference to the drawings.

First Embodiment of the Present Invention

Figure 1:
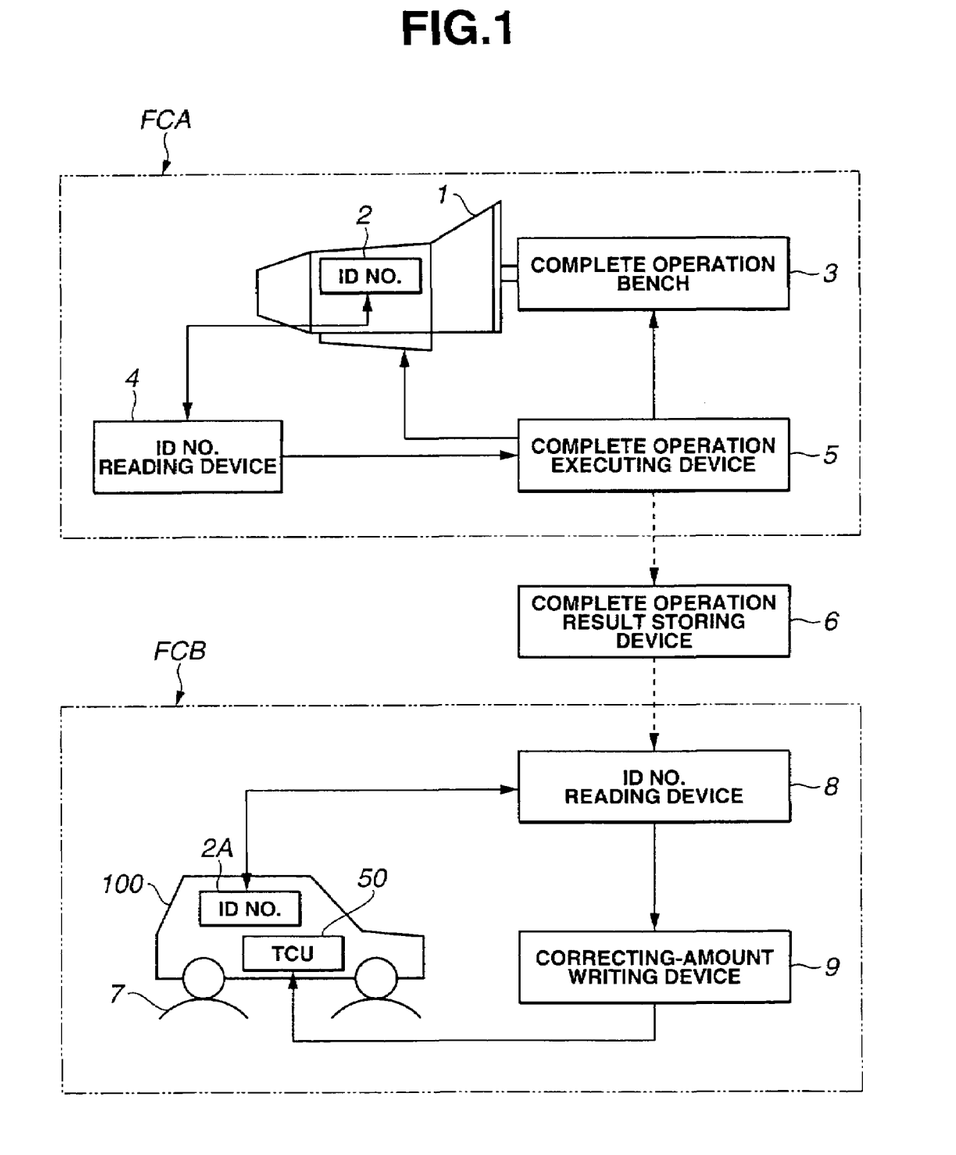
FIG. 1 is a block diagram showing a property correcting system of an automatic transmission using a complete operation.
Figure 2:
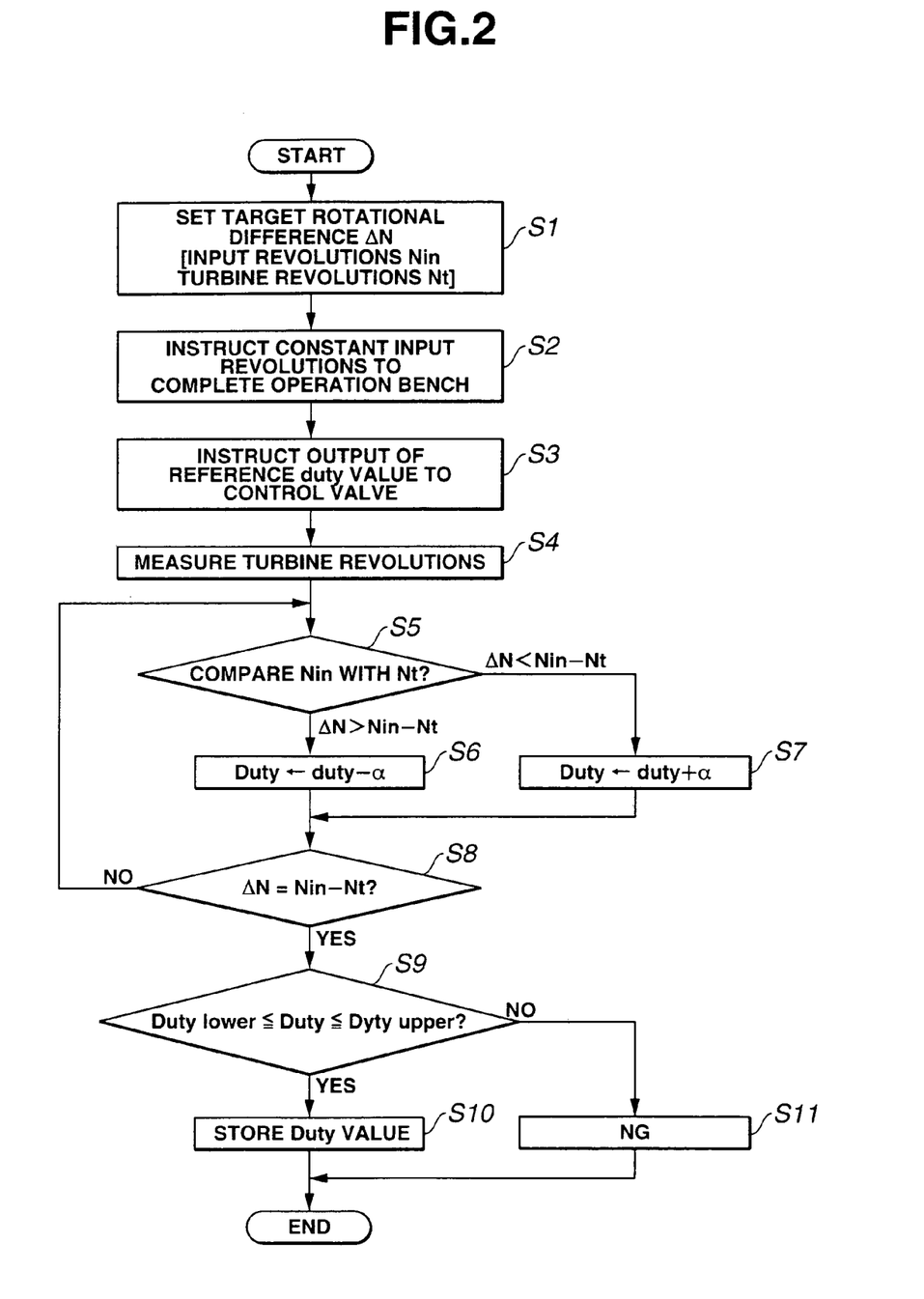
FIG. 2 is a flowchart showing measurement processing of the variation in properties of the automatic transmissions using the complete operation.
Figure 3:
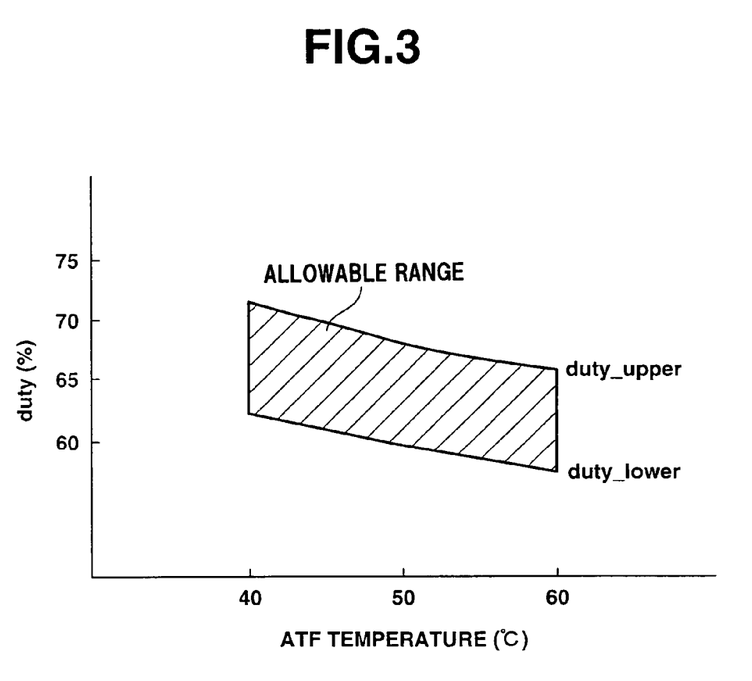
FIG. 3 is an explanatory diagram of a standard for determining the shipping, and FIGS. 4 to 6 relate to a second embodiment of the present invention.

First, the first embodiment of the present invention will be described. FIGS. 1 to 3 relate to the first embodiment of the present invention.

FIG. 1 shows a property correcting system of an automatic transmission structured in the manufacturing and shipping line in a factory. Reference numeral FCA denotes an assembly factory of the automatic transmission, and reference numeral FCB denotes a vehicle assembly factory in which an automatic transmission 1 conveyed from the assembly factory FCA of the automatic transmission is assembled for installation to a vehicle body 100 together with an electronic control unit (TCU) 50. The automatic transmission 1 is a so-called direct-AT-system automatic transmission, which has solenoid valves to respective frictional engaging elements, such as a clutch or brake and controls the engagement (that is, controls the oil pressure) of the frictional engaging elements, and is similar to the automatic transmission disclosed in Japanese Unexamined Patent Application Publication No. 2003-004130 of the present applicant.

Schematically, the automatic transmission 1 comprises: a torque converter for receiving the driving force from an engine output shaft; and a multi-stage automatic transmission unit arranged to the torque converter. The multi-stage automatic transmission unit comprises a planetary gear unit provided onto the input shaft, and frictional engaging elements. The frictional engaging elements comprise: a high clutch for engaging or disengaging the power transmission between the input shift and a planetary carrier; a reverse clutch for engaging or disengaging the power transmission between the input shaft and a sun gear; a 2-4 brake for engaging or disengaging the power between the sun gear and an automatic transmission case; a low clutch for engaging or disengaging the power between the planetary carrier and a ring gear; a low one-way clutch for engaging or disengaging the power in one direction between a low clutch drum rotatable together with the planetary carrier and the automatic transmission case; and a low & reverse (L-R) brake for engaging or disengaging the power between the low clutch drum and the automatic transmission case. A duty solenoid valve for adjusting the hydraulic pressure of a control valve is driven in a duty cycle manner, thereby controlling the engagement (controlling the oil pressure) of the frictional engaging elements.

The automatic transmission 1 is assembled and completed in the assembly factory FCA of the automatic transmission. Then the automatic transmission 1 is provided for inspecting the property at a complete operation bench 3. An ID number 2, such as bar-code, for identifying the different specifications for each type, such as a vehicle model or engine type to be mounted, is adhered to individual automatic transmissions. The automatic transmission 1 is shipped to the vehicle assembly factory FCB.

The complete operation of the complete operation bench 3 is executed and controlled by a complete operation executing device 5 for each automatic transmission using the ID number 2 read by an ID number reading device 4. The solenoid valve for adjusting the hydraulic pressure of the control valve arranged in the automatic transmission 1 or the complete operation bench 3 is controlled, the amount of correction of the variation in properties of the automatic transmission 1 is determined, and it is determined whether or not the shipping is executed. The control operation and the determination are simultaneously performed. The result of complete operation of the automatic transmission 1 is stored in a complete operation result storing device 6, corresponding to the ID number 2 for each automatic transmission 1, and is sent via a communication line or a storage medium to the vehicle assembly factory FCB.

In the vehicle assembly factory FCB, the automatic transmission 1 is assembled to the vehicle body 100, and data for correcting the variation in properties is written to the TCU 50 in a free roller check process on a chassis dynamometer 7 at the line end. In the free roller check process, an ID number reading device 8 reads an ID number 2A by bar-code and further reads data on complete operation from the complete operation result storing device 6, and a correcting-amount writing device 9 determines the amount of correction of the variation in properties of the automatic transmission 1 and writes the result to the TCU 50.

The ID number 2A may be an ID number adhered to the automatic transmission 1. Generally, the ID number of the automatic transmission 1 is not easily read after mounting the automatic transmission 1 to the vehicle body 100, the ID number 2 of the automatic transmission 1 may be replaced with a vehicle body No. at the stage of mounting the automatic transmission 1 to the vehicle body 100. In this case, a corresponding relationship between the vehicle body No. and the ID number 2 of the automatic transmission 1 is stored in the ID number reading device 8.

In the property correcting system of the automatic transmission with the above-mentioned structure, at the timing of the complete operation of the automatic transmission 1, the temperature of the automatic transmission fluid (ATF) or the input revolutions is relatively stably kept compared with the actual driving conditions. The amount of correction relative to the property for obtaining the preferable shift quality of the transmission is grasped. The grasped amount of correction is written and stored into the TCU 50 for controlling the automatic transmission 1, thereby omitting time required for prompting the learning based on the actual vehicle driving and obtaining the preferable shift quality of the transmission as compared with that at the initial timing of shipping.

That is, in the conventional complete operation, the oil pressure of each clutch is measured, and it is determined, based on the measurement value is within an allowable range, whether or not the automatic transmission 1 is shipped. The measurement of oil pressure is influenced from the difference in devices having specifications for respective complete operation benches, the deviation in calibrated values or the deterioration of the oil pressure sensor for detecting the oil pressure, or the mixture of air in a pipe, and the improvement in measurement precision is not possible. The complete operation according to the first embodiment abolishes the analog measurement including a large number of errors, thereby enabling the shipping inspection with high precision.

Specifically, the output shaft of the automatic transmission 1 is installed to the complete operation bench 3 and is set to a predetermined gear shift position, thereby giving the torque converter to predetermined input revolutions. In the state, of the two engaged clutches (brakes), the controlled variable (driving duty) of a duty solenoid valve is adjusted as a hydraulic control valve for controlling the oil pressure of one clutch, such that the difference between the input revolutions of the torque converter and the turbine revolutions of the torque converter is set, to a reference value. That is, a partial clutch engagement state is intentionally formed by the two clutches and one clutch whose oil pressure is reduced measures the driving duty necessary for generating a predetermined torque which keeps the difference between the input revolutions and the turbine revolutions to the reference valve.

In this case, the driving duty for the duty solenoid valve of the control valve depends on the variation in various factors, such as, properties of the respective elements constituting the automatic transmission 1, e.g., properties of oil pressure of the control valve, the frictional coefficients of the clutches, the properties of output torque of the torque converter, urging force of a return spring of a clutch piston, and clutch clearance. The variations appear as the variation in driving duties of the duty solenoid valve for keeping the difference between the input revolutions and the turbine revolutions to be constant. Therefore, a differential value between the measured driving duty and the reference value is stored in the TCU 50 as the amount of correction, thereby ensuring the preferable shift quality of the transmission, starting from the shipping timing.

Next, a description is given of the measurement processing of the variation as a result of complete operation of the automatic transmission 1 with reference to the flowchart in FIG. 2.

In this processing, in step S1, the difference between input revolutions Nin of the torque converter and turbine revolutions Nt, namely Nin−Nt is referred to difference of revolutions. A target value of the difference of revolutions is set as a target rotational difference $\Delta N$, hereinafter. The rotational difference $\Delta N$ is the difference of revolutions upon driving, by a reference duty value, the duty solenoid valve of the control valve for controlling oil pressure in the clutch or brake to be controlled in the state of setting the automatic transmission 1 at a predetermined gear shift position. For example, in the case of the measurement using the 2-4 brake, the target rotational difference ΔN is 700 rpm. In the case of the measurement using the high clutch and the low clutch, the target rotational difference ΔN is 140 rpm.

In step S2, a command for setting the input revolutions of the automatic transmission 1 to the complete operation bench 3 to be constant (e.g., 1000 rpm) is outputted. In step S3, a command for outputting a driving duty duty of the duty solenoid valve for controlling the designated clutch or brake of the control valve, as a reference value (varied depending on the respective clutch and brake) and then the processing routine advances to step S4.

In step S4, a turbine rotational speed sensor attached to the automatic transmission 1 measures the turbine revolutions Nt. In step S5, a difference of revolutions (Nin−Nt) between the input revolutions Nin which is kept to constant and the turbine revolutions Nt is calculated, and is compared with the target rotational difference ΔN.

As the result, when ΔN>Nin−Nt and the difference of revolutions (Nin−Nt) is smaller than the target rotational difference ΔN, the processing routine advances from step S5 to step S6 whereupon the driving duty duty of the duty solenoid valve is reduced by a set value a corresponding to the difference (duty←duty−α). When ΔN<Nin−Nt and the difference of revolutions (Nin−Nt) is larger than the target rotational difference ΔN, the processing routine advances from step S5 to step S7 whereupon the driving duty duty of the duty solenoid valve is increased by the set value a corresponding to the difference (duty←duty+α).

After increasing/reducing the driving duty duty of the duty solenoid by the feedback operation based on the difference from the target rotational difference ΔN, the processing routine advances to step S8 whereupon it is checked to see if the difference of revolutions (Nin−Nt) is converged to the target rotational difference ΔN. As the result, a relation of ΔN≠(Nin−Nt) is obtained. When the difference of revolutions is not converged to the target rotational difference ΔN, the processing routine returns from step S8 to step S5 whereupon the above-mentioned processing continues. When ΔN=(Nin−Nt) and the difference of revolutions is converged to the target rotational difference ΔN, the processing routine advances from step S8 to step S9.

In step S9, it is checked to see if the driving duty duty that is converged to the target rotational difference ΔN satisfies the shipping determining standard. That is, it is determined whether or not the shipping is possible. Referring to FIG. 3, the shipping determining standard is set when the complete operation is performed upon keeping the ATF temperature is within a setting range (approximately 40 to 60° C.). The driving duty duty that is converged to the target rotational difference ΔN is set as an allowable range between an upper limit duty_upper and a lower limit duty_lower upon integrating the tolerances on design. The shipping determination of the automatic transmission is performed by checking if the driving duty duty is within the range.

When the measured driving duty duty is within the shipping determining standard, it is determined that the automatic transmission can be shipped. Then, in step S10, the driving duty value duty is stored and thereafter the processing ends. When the measured driving duty is not within the shipping determining standard, it is determined that the automatic transmission cannot be shipped. Then, in step S11, contents of NG (no good) are recorded and thereafter the processing ends. In the free roller process after the assembly to the vehicle, the driving duty values duty of the individual automatic transmissions 1 determined as shipped ones and stored, namely the differential value to the reference value is written to the TCU 50 as the amount of correction of the respective automatic transmissions 1.

As mentioned above, according to the first embodiment, at the shipping stage of the automatic transmission, the driving duty of the duty solenoid valve having the difference between the input revolutions and the turbine revolutions, as the reference value, is measured without the analog measurement including a large number of errors, and the variation in properties of the individual automatic transmissions is obtained. The measurement precision of the complete operation at the shipping timing is improved and is close to the tolerance which is originally necessary. Further, the performance of the entire automatic transmission is managed, including the variation in frictional coefficient of the clutch, clutch clearance, and return spring of the clutch piston as well as the variation in oil pressures of the automatic transmission. Since the amount of correction of the variation in properties obtained by the precise measurement is stored in the TCU 50, the preferable shift quality is obtained, starting from the initial shipping timing of the product, without prompting the learning based on the actual vehicle driving.

Further, since the difference in each complete operation is not caused, the correlativity setting between the complete operation benches for determining the shipping is not necessary and the operating efficiency is improved, thereby contributing to the reduction in man-hour.

Second Embodiment of the Present Invention

Figure 4:
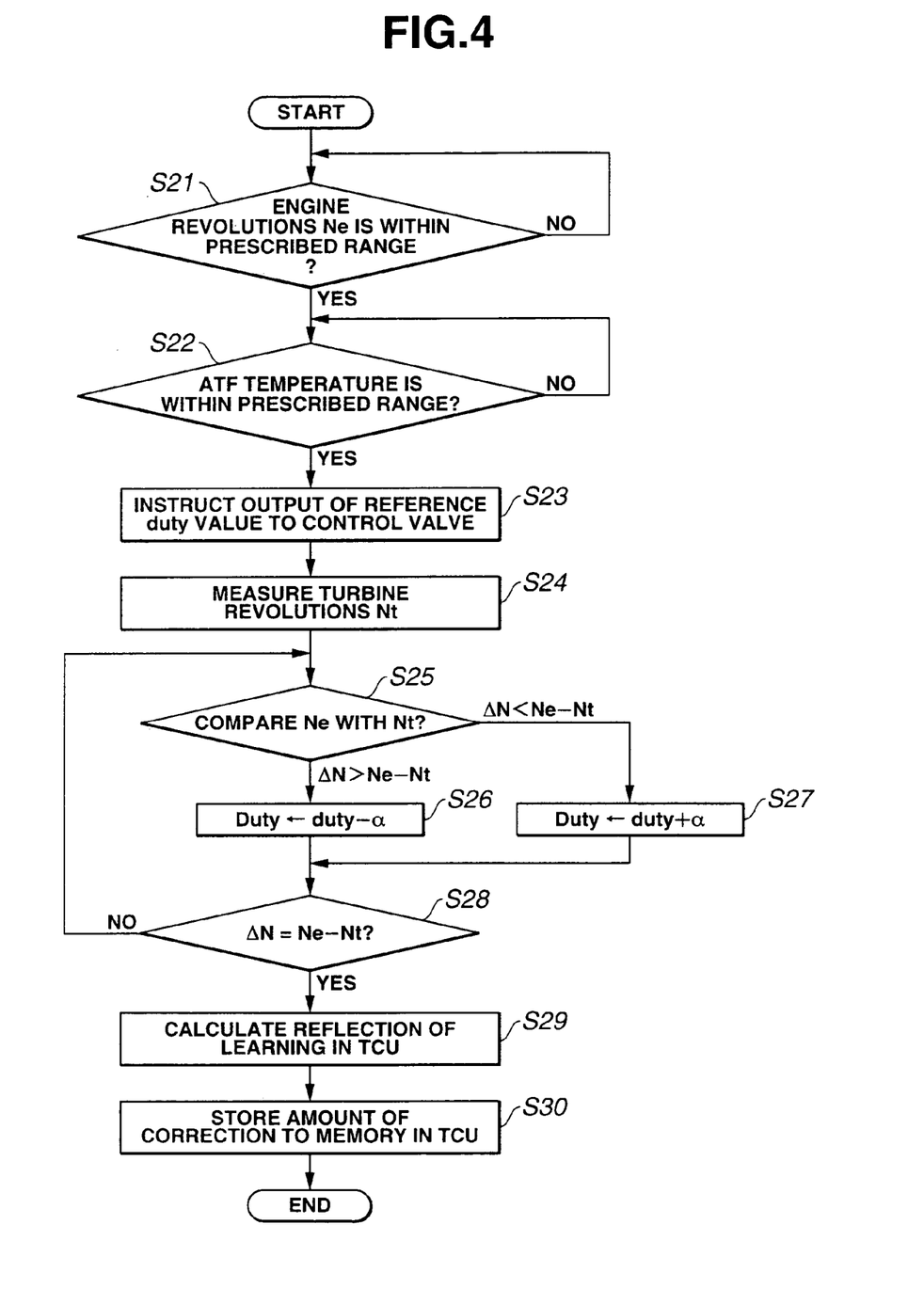
FIG. 4 is a flowchart for correcting processing of the variation in properties of the automatic transmission in a vehicle.
Figure 5:
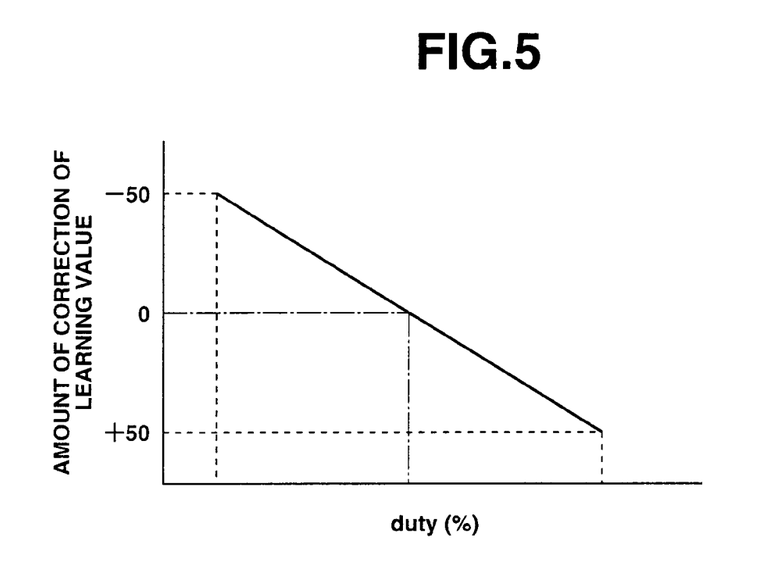
FIG. 5 is an explanatory diagram showing a correlation between the amount of correction and a learning value.
Figure 6:
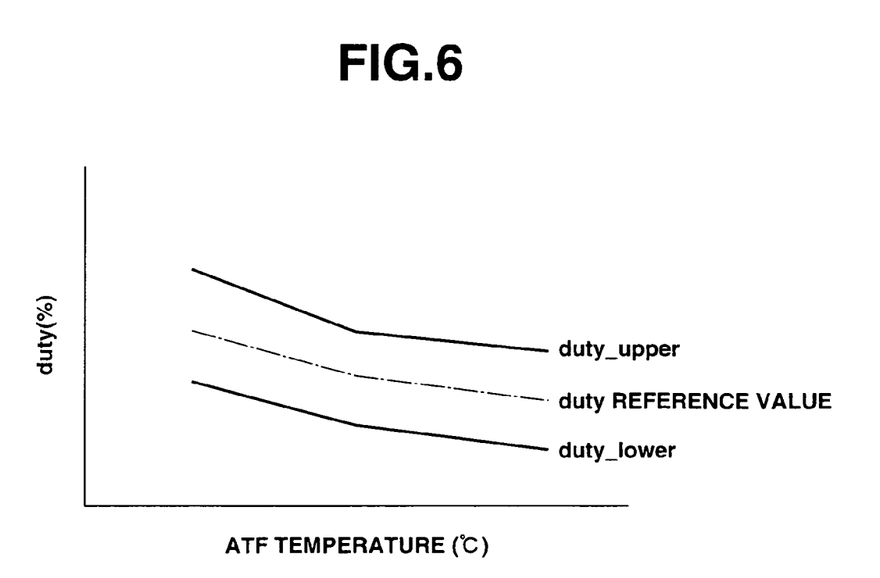
FIG. 6 is an explanatory diagram showing a relationship between a reference property and the properties of an upper limit and a lower limit.

Next, the second embodiment of the present invention will be described. FIGS. 4 to 6 show the second embodiment of the present invention.

According to the second embodiment, a correcting system of the automatic transmission is structured to the vehicle side. The TCU 50 executes processing shown in FIG. 4, thereby measuring the variation in driving duty duty of the duty solenoid valve of the automatic transmission 1 under the condition according to the complete operation. Further, the variation is reflected to a learning value.

That is, in the processing shown in FIG. 4, in steps S21 and S22, it is checked to see if engine revolutions Ne is within a prescribed range and to see if the ATF temperature is within a prescribed range. That is, the check operation means that the automatic transmission 1 according to the second embodiment is under the same conditions as those of the complete operation of the automatic transmission 1 according to the first embodiment. When the engine revolutions Ne and the ATF temperature are within prescribed ranges, the processing routine advances to step S23 whereupon a command for outputting, as a reference value, the driving duty duty of the duty solenoid valve for controlling the designated clutch or brake of the control valve, and then the processing routine advances to step S24.

In step S24, turbine revolutions Nt is measured by the turbine rotational speed sensor provided for the automatic transmission 1. In step S25, a difference of revolutions (Ne−Nt) between the engine revolutions Ne, as the input revolutions of the automatic transmission, and the turbine revolutions Nt is calculated, and is compared with the target rotational difference ΔN.

When ΔN>Ne−Nt, the processing routine advances from step S25 to step S26 whereupon the driving duty duty of the duty solenoid valve is reduced by a set value a corresponding to the difference (duty←duty−α). When ΔN<Ne−Nt, the processing routine advances from step S25 to step S27 whereupon the driving duty duty of the duty solenoid valve is increased by the set value a corresponding to the difference (duty←duty+α).

After that, the processing routine advances to step S28 whereupon it is checked to see if the difference of revolutions (Ne−Nt) is converged to the target rotational difference ΔN. When ΔN≠(Ne−Nt), the processing returns from step S28 to step S25 whereupon the above-mentioned processing continues. When ΔN=(Ne−Nt) and the difference of revolutions is converged to the target rotational difference ΔN, the processing routine advances from step S28 to step S29 whereupon the calculation is performed to reflect, to the learning value in the TCU 50, the deviation from the reference value of the driving duty duty in this case. Referring to FIG. 5, in the reflection to the learning value, when the driving duty duty is the reference value, the amount of correction of the learning value is 0. Then, the amount of correction of the learning value is increased and reduced in accordance with the rate of increased and reduced amount to the reference value of the measured driving duty duty.

After calculation for reflection to the learning value in step S29, the processing advances to step S30 whereupon it is checked to see if the driving duty duty is between an upper limit duty_upper and a lower limit duty_lower. The upper and lower limits are set from the reference value that is preset in accordance with the ATF temperature as shown in FIG. 6. When it is determined that the driving duty duty is between the upper limit duty_upper and the lower limit duty_lower, the amount of correction is stored in a memory for control data in the TCU 50. When it is determined that the driving duty duty is not between the upper limit duty_upper and the lower limit duty_lower, it is determined as abnormal and then the data is stored in a backup memory for checking the default. Further, an alarming message is issued to a driver and then the processing ends.

According to the second embodiment, the property correcting system of the automatic transmission 1 is structured by the TCU 50 on the vehicle side, and the variation in properties is corrected in advance. For example, in the check and maintenance of a dealer in the market, upon exchanging the automatic transmission 1 or the TCU 50, or upon shutting-off the power of the TCU 50 and resetting the learning value, shift quality of the transmission is not impaired by the reset of learning value, and a preferable shift quality can be obtained without the promotion of learning.

The embodiments of the present invention are described. However, the present invention is not limited to the above embodiments, and can be varied without departing the spirit of the present invention. For example, the property correcting system according to the present invention can be applied to a control clutch in a transfer for four-wheel-drive as well as shift clutch of the automatic transmission. A relationship between the controlled variable and a transmission torque is corrected, thereby improving the traction performance. Further, an area for preventing the phenomenon of tight corner braking is increased. According to the embodiments, the hydraulic control valve is used as the duty solenoid valve. However, the present invention is not limited to this and another solenoid valve, such as a linear solenoid valve, is arranged according to the present invention.

INDUSTRIAL APPLICABILITY

As mentioned above, according to the present invention, the variation in properties of individuals is corrected without prompting the learning based on the actual driving, and a preferable shift quality is obtained.

CROSS-REFERENCE TO RELATED APPLICATION

The present application is based on the priority of (1) Japanese Patent Application No. 2003-76131 filed to Japan on Mar. 19, 2003. The disclosure of (1) is referred to the description, claims, and drawings of the present invention.

The invention claimed is:

1. A property correcting system of an automatic transmission for shift operation by engaging and disengaging frictional engaging elements in a multi-stage transmission unit arranged to a torque converter using a hydraulic control valve, comprising:
    means for measuring a controlled variable of the hydraulic control valve relative to a difference between input revolutions of the torque converter and turbine revolutions of the torque converter, in a state that said input revolutions of the torque converter set to be constant; and
    means for storing the amount of correction based on the controlled variable to an electronic control device for controlling the automatic transmission.

2. The property correcting system of the automatic transmission according to claim 1 wherein a shipping of the automatic transmission is determined based on as whether or not the measured value of the controlled variable of the hydraulic control valve is within a preset allowable range.

3. The property correcting system of the automatic transmission according to claim 2, wherein the shipping is determined in consideration of the oil temperature of the automatic transmission.

4. A property correcting system of an automatic transmission for shift operation by engaging and disengaging frictional engaging elements in a multi-stage transmission unit arranged to a torque converter using a hydraulic control valve, comprising:
    means for measuring a controlled variable of the hydraulic control valve for keeping, to be constant, a difference between input revolutions of the torque converter and turbine revolutions of the torque converter under a set condition; and
    means for reflecting a differential value between the measured value of the controlled variable of the hydraulic control valve and a reference value to a learning result of learning the property of the automatic transmission.

5. A property determining system of an automatic transmission for shift operation by engaging and disengaging frictional engaging elements in a multi-stage transmission unit arranged to a torque converter using a hydraulic control valve, comprising:
    means for measuring a controlled variable of the hydraulic control valve for keeping, to be constant, the difference between input revolutions of the torque converter and turbine revolutions of the torque converter in a test driving after assembling the automatic transmission; and
    means for determining whether or not the automatic transmission is shipped based on as whether or not the measured value of the controlled variable of the hydraulic control valve is within a preset allowable range.

6. The property determining system of the automatic transmission according to claim 5, wherein the shipping is determined in consideration of the oil temperature of the automatic transmission.

7. The property correcting system of the automatic transmission according to claim 1, wherein the hydraulic control valve is used for driving one of said frictional engaging elements.

8. The property correcting system of the automatic transmission according to claim 1, wherein said means for measuring measures the controlled variable of the hydraulic control in a state that an output shaft of the automatic transmission is installed.

9. The property correcting system of the automatic transmission according to claim 1, wherein measuring said controlled variable is conducted in a state that said automatic transmission is set to a predetermined gear shift position.

10. The property correcting system of the automatic transmission according to claim 1, wherein said automatic transmission is installed to a test operation bench and said input revolutions of the torque converter is controlled by said test operation branch.

11. A property correcting system of an automatic transmission for shift operation by engaging and disengaging frictional engaging elements in a multi-stage transmission unit arranged to a torque converter using a hydraulic control valve, comprising:

means for measuring a controlled variable of the hydraulic control valve relative to a difference between input revolutions of the torque converter and turbine revolutions of the torque converter; and means for storing an amount of correction based on the controlled variable to an electronic control device for controlling the automatic transmission, and wherein a shipping of the automatic transmission is determined based on whether or not the measured value of the controlled variable of the hydraulic control valve is within a preset allowable range.

12. The property correcting system of the automatic transmission according to claim 11, wherein the shipping is determined in consideration of the oil temperature of the automatic transmission.

13. The property correcting system of the automatic transmission according to claim 11, wherein the hydraulic control valve is used for driving one of said frictional engaging elements.

14. The property correcting system of the automatic transmission according to claim 11, wherein said means for measuring measures the controlled variable of the hydraulic control in a state that an output shaft of the automatic transmission is installed in a test operation bench.

15. The property correcting system of the automatic transmission according to claim 11, wherein said means for measuring that measures the controlled variable of the hydraulic control in a state that said input revolutions of the torque converter is set to be constant.

16. The property correcting system of the automatic transmission according to claim 11, wherein measuring said controlled variable is conducted in a state that said automatic transmission is set to predetermined gear shift position.

17. The property correcting system of the automatic transmission according to claim 11, wherein said automatic transmission is installed to a test operation bench and said input revolutions of the torque converter is controlled by said test operation bench.

* * * * *